United States Patent
Gardner

[11] 3,814,487
[45] June 4, 1974

[54] THRUST BEARING WITH PAD-RETAINING AND LUBRICATION MEANS

[75] Inventor: Willis W. Gardner, Waukesha, Wis.

[73] Assignee: Waukesha Bearings Corporation, Waukesha, Wis.

[22] Filed: Jan. 8, 1973

[21] Appl. No.: 321,598

[52] U.S. Cl. .............................................. 308/160
[51] Int. Cl. ........................................... F16c 17/06
[58] Field of Search ............................... 308/9, 160

[56] References Cited
UNITED STATES PATENTS

| 1,293,471 | 2/1919 | Kingsbury | 308/160 |
| 3,142,519 | 7/1964 | Abromovitz | 308/160 |
| 3,201,184 | 8/1965 | Hill | 308/160 |
| 3,586,401 | 6/1971 | Gravelle | 308/160 |

Primary Examiner—Charles J. Myhre
Assistant Examiner—Frank Susko
Attorney, Agent, or Firm—Arthur L. Morsell, Jr.

[57] ABSTRACT

A plurality of tiltable thrust-bearing pads are supported in circumferentially spaced relationship around one face of a bearing retainer adjacent a rotatable thrust collar, the latter bearing against the outer faces of the bearing pads. Oil ducts are formed in each bearing pad for conducting oil from the inner face of the pad to its ends, and relatively cool oil under pressure is supplied to the ducts at the inner face of each pad. The ducts are angled and positioned to direct jets of cool oil against the thrust collar in the spaces between the ends of adjacent pads to reduce the temperature of the oil film which is carried by the thrust collar from one pad to another during rotation. A circular resilient O-ring seal bears against the inner face of each bearing pad and defines an oil chamber for receiving cool oil under pressure and for supplying the oil to the ducts at the inner face of the pad. A plurality of cap screws are threaded into the bearing retainer at spaced locations around the periphery of the retainer, the head of each cap screw being positioned in a corresponding space between two bearing pads and serving to limit the circumferential movement of the bearing pads. Each bearing pad has a pin extending adjacent to the head of a corresponding cap screw to prevent the cap screw from becoming inadvertently unthreaded and detached from the bearing retainer.

11 Claims, 3 Drawing Figures

PATENTED JUN 4 1974　　　　　　　　　　　　　　　　　3,814,487

3,814,487

THRUST BEARING WITH PAD-RETAINING AND LUBRICATION MEANS

BACKGROUND OF THE INVENTION

This invention relates in general to flood lubricated thrust bearings of the type having a plurality of tiltable bearing pads which are circumferentially spaced around one face of a bearing retainer to provide a bearing surface for a rotating thrust collar adjacent to the outer faces of the bearing pads.

One of the problems encountered in such thrust bearings is a build-up of temperature in the thin film of oil that separates the rotating thrust collar from the stationary bearing pads. This build-up of temperature is due to hydrodynamic shearing of the oil film, which becomes an important source of heat at relatively high speeds and/or large loads. The oil film adheres to the rotating thrust collar and is carried from one bearing pad to the next around the ring of bearing pads, being sheared and heated to a higher temperature at each succeeding bearing pad, until it reaches a temperature that is significantly higher than the oil supply temperature. As speeds and/or loads are increased, the temperature of the oil film rises and eventually reaches a level at which the oil film breaks down and permits the rotating thrust collar to rub against the bearing pads.

To extend the speed and load capabilities of such bearings, it has been proposed in the past to lower the temperature of the above-noted oil film by removing the heated oil film from the thrust collar in the spaces between the bearing pads and then replacing the heated oil film with a cool oil film. Two prior art arrangements for performing this operation are shown in U.S. Pat. Nos. 3,378,319 and No. 3,454,312. In the first patent, a plurality of combined oil wiper devices and lubricant feed devices are mounted in the spaces between the adjacent bearing pads of a thrust bearing. The purpose of the oil wiper devices is to scrape the hot oil film from the thrust collar, and the purpose of the lubricant feed devices is to replace the hot oil film with a cool oil film. In the second patent, a plurality of lubricant feed devices are mounted in the spaces between the adjacent bearing pads with ducts for directing jets of cool oil onto the thrust collar with sufficient force to displace the hot oil film, or at least to cool it by mixing with the cooler oil.

Although the above-noted prior art oil cooling systems did reduce the oil film temperature on the thrust collar, they had several shortcomings, and it is an object of this invention to provide an oil film cooling system that avoids these shortcomings. For examples, these prior art oil cooling systems do nothing to reduce the build-up of temperature in the bearing pads. As the oil is sheared at the surface of each bearing pad, part of the resulting temperature increase is communicated from the oil film to the pad. To merely cool the oil film in the space between the pads does not prevent the temperature of the pads from building up to a harmful level. Accordingly, one object of this invention is to provide a thrust bearing oil film cooling system which also cools the bearing pads.

Another shortcoming of the prior art cooling systems is that they require lubricant feed devices to be mounted in the spaces between the ends of adjacent bearing pads, and this complicates the bearing structure and makes it difficult to assemble. Moreover, the space between adjacent bearing pads is relatively small and tends to cramp the structure of the lubricant feed devices and thus limits their effectiveness. Accordingly, another object of this invention is to provide a thrust bearing oil film cooling system which does not require lubricant feed devices in the spaces between bearing pads.

A further object of this invention is to provide a thrust bearing oil film cooling system having improved effectiveness.

An additional object of this invention is to provide a thrust bearing having improved speed and load capabilities.

Another object of this invention is to provide a thrust bearing having improved pad retainer means for holding the bearing pads thereof in position.

A further object of this invention is to provide a thrust bearing oil film lubrication system and pad retainer means which are relatively simple and sturdy in structure and reliable in operation.

Other objects and advantages of the invention will become apparent to those skilled in the art from the following description of one illustrative embodiment of the invention.

SUMMARY OF THE INVENTION

In accordance with this invention, the above-noted objects are attained by providing a special arrangement in combination with a plurality of thrust bearing pads which are supported in circumferentially spaced relationship around one face of the bearing retainer adjacent to a rotatable thrust collar, the latter bearing against the outer faces of the bearing pads. Oil ducts are formed in each bearing pad for conducting oil from the inner face of the pad to its ends, and relatively cool oil under pressure is supplied to the ducts at the inner face of each pad. At least portions of the ducts are angled and positioned to direct jets of cool oil against the thrust collar in the spaces between the ends of the adjacent pads to reduce the temperature of the oil film carried by the thrust collar to adjacent pads. In the preferred embodiment, a circular resilient O-ring seal bears against the inner face of each bearing pad and forms an oil chamber for receiving cool oil under pressure and for supplying the oil to the ducts at the inner faces of the pads. In order to hold the pads in position, a plurality of cap screws are threaded at spaced locations around the periphery of the retainer, the head of each cap screw being positioned in a corresponding space between two bearing pads and serving to limit the circumferential movement of the bearing pads. A pin extends from one end of each bearing pad adjacent to the head of the corresponding cap screw to prevent the cap screw from becoming inadvertently unthreaded and detached from the bearing retainer.

DESCRIPTION OF THE PREFERRED EMBODIMENT

Figure 1:
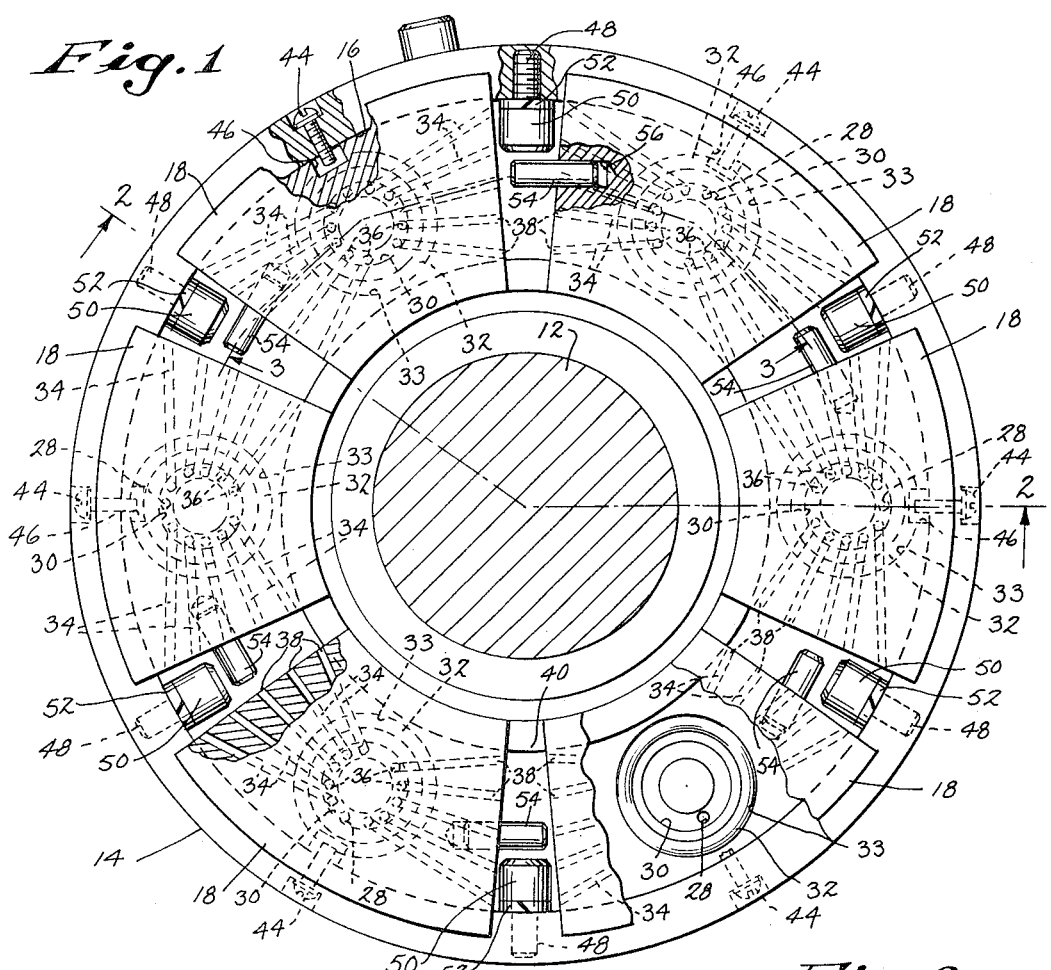
FIG. 1 is a plan view showing one illustrative embodiment of the invention taken on the line 1—1 of FIG. 2 and illustrating the outer surface of the bearing pads with portions thereof being cut away to expose interior details.
Figure 2:
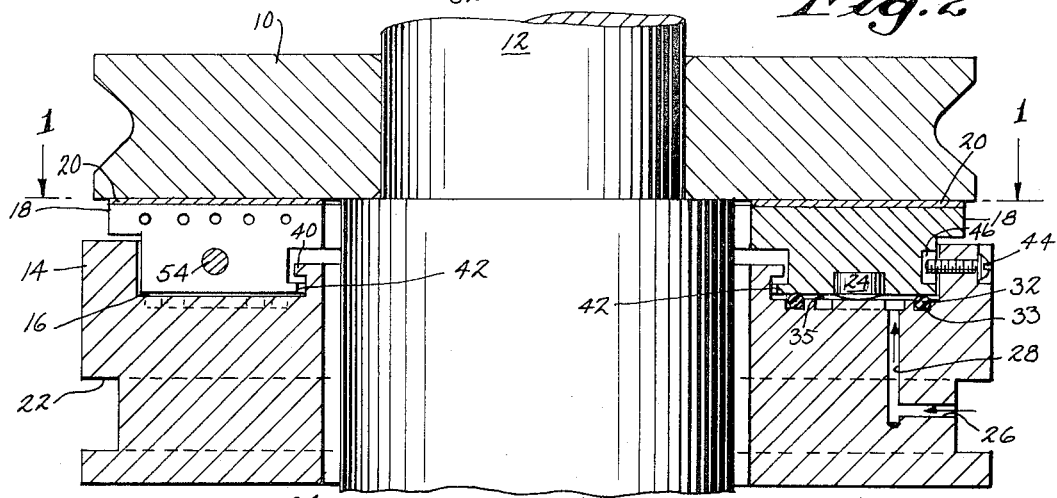
FIG. 2 is a radial section of the embodiment shown in FIG. 1 taken on the line 2—2 of FIG. 1.

Referring to FIGS. 1 and 2, the purpose of this embodiment is to provide a bearing surface and support for a thrust collar 10 which is rigidly attached to a rotatable shaft 12. This embodiment of the invention includes an annular retainer ring 14 which has an annular recess 16 in its end surface (see FIG. 2) for receiving and supporting a plurality of bearing pads 18. As best shown in FIG. 1, the bearing pads 18 are disposed in circumferentially spaced relationship around the annular recess 16. The upper or outer surface of bearing pads 18 are coated with a layer of babbitt or similar bearing material 20 to provide a bearing surface for the rotating thrust collar 10. The annular retainer ring 14 which supports the bearing pads 18 is in turn supported by a conventional housing which is not shown in the drawings but which is well known to those skilled in the art, and includes conventional oil pump means for introducing cool oil under pressure into an annular groove 22 in the side of retainer ring 14 to lubricate the bearing and to cool the heated portions thereof as will be explained hereinafter.

In this particular embodiment of the invention, the bearing pads 18 are tiltably supported in the annular recess 16 of the retainer ring 14 to allow the pads 18 to tiltably move slightly as is well known in the art. This tiltable connection is obtained by means of hardened bearing buttons 24 which are inserted in matching openings in the bottom of pads 18 and which extend a short distance beyond the bottom of the pad. The bottom of each hardened bearing button 24 is spherically shaped to provide a tiltable contact at the point where it engages the bottom of the annular recess 16 in retainer ring 14. The purpose of the hardened bearing buttons 24 is to provide a tiltable contact area which is hard enough to resist deformation and wear due to the relatively large pressures developed in the contact area due to its relatively small size.

The portions of the disclosed embodiment which have been described above are conventional both in their construction and operation and act to provide a bearing and thrust support surface for the rotating thrust collar 10. It will be understood by those skilled in the art that this type of bearing is flood lubricated by means which are not shown in the drawing to provide a relatively thin oil film between the inner surface of the rotating thrust collar 10 and the bearing surface 20 of the bearing pads 18 so that the thrust collar 10 is supported by an oil film which permits it to rotate relatively freely. It will also be understood by those skilled in the art that rotation of the thrust collar 10 causes a hydrodynamic shearing of the oil film along the bearing surface 20 of the bearing pads 18 so that the thrust collar 10 is supported by an oil film which permits it to rotate relatively freely. It will also be understood by those skilled in the art that rotation of the thrust collar 10 causes a hydrodynamic shearing of the oil film along the bearing surface 20 of each of the bearing pads 18 and that this shearing raises the temperature of the oil in the oil film by a small amount each time the shearing occurs. In such a bearing construction, a problem arises due to the fact that the thin film of oil upon which the thrust collar 10 is supported above the bearing pads 18 adheres to the surface of the thrust collar 10 and is normally carried virtually intact from one bearing pad to the next as the thrust collar 10 rotates. Accordingly, this thin film of oil is repeatedly sheared as it moves from bearing pad to bearing pad and its temperature is raised by a small increment each time it is sheared. This causes the temperature of the oil film to rise to harmful levels at high enough speed and/or load conditions. One of the objects of this invention is to cool this heated oil film in the spaces between adjacent bearing pads 18 so as to extend the speed and/or load capabilities of the bearing. Basically, this is done by directing jets of cool oil onto the rotating thrust collar in the spaces between the bearing pads with sufficient force to remove the hot oil and to replace it with a cool oil film. The apparatus by which this action is effected is described below.

Referring in particular to FIG. 2, relatively cool supply oil under pressure is delivered to the annular oil groove 22 in bearing ring 14, and is conducted from groove 22 through a plurality of oil ducts 26 and 28 which deliver the oil into an annular recess 30 formed in the retainer in a location below the corresponding bearing pad 18 and in a location surrounding its hardened bearing button 24. As best shown in FIG. 1, one of the annular oil recesses 30 is located under each of the bearing pads 18, and each annular oil recess 30 is coupled to oil groove 22 by means of corresponding ducts 26 and 28. The annular oil recesses 30 are surrounded by resilient O-ring seals 32 that are seated in annular grooves 33, either in the bottom of recess 16 or in the bottom of the bearing pad 18. In this particular embodiment, the resilient O-ring seals 32 fit into annular groove 33 in the bottom of recess 16 and resiliently bear against the bottom of the corresponding bearing pad 18 to form an oil chamber 35 which comprises the annular oil groove 30 and the space that separates the bottom of the bearing pad 18 from the bottom of the annular recess 16 within the inner periphery of the resilient O-ring seal 32. As best shown in FIG. 1, one of the above-described resilient O-ring seals 32 is seated under each of the bearing pads 18 to provide an oil chamber 35 as described above for each of the bearing pads 18.

Figure 3:
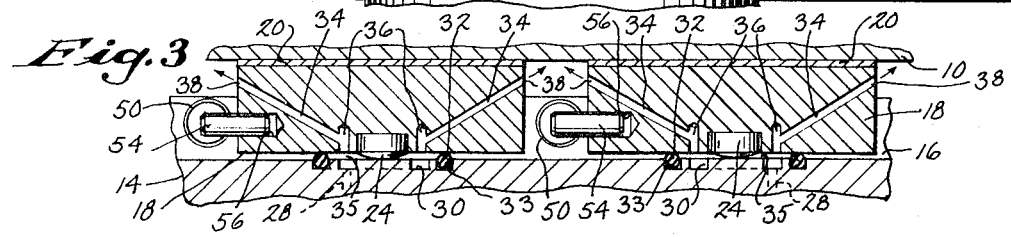
FIG. 3 is a fragmentary circumferential sectional view taken on the broken line 3—3 of FIG. 1.

Each of the bearing pads 18 is provided with a plurality of ducts 34 each of which extends from the central bottom or back surface of the pad 18 to the ends of the pad. The inner ends 36 of the ducts 34 communicate into the oil chamber 35, which is defined by the resilient O-ring seal 32, to receive cool oil under pressure therefrom as best shown in FIG. 3. At least the end portions 38 of the ducts 34 are disposed at an angle to the surface of thrust collar 10 so as to direct jets of cool oil against the surface of thrust collar 10 in the spaces between the bearing pads 18 as indicated by the arrows in FIG. 3. The oil pressure for the lubrication system is selected in accordance with well-known prior art principles to provide oil jets whose velocity is sufficient to disturb the film of hot oil on thrust collar 10 sufficiently to replace it with cool oil or at least to mix it with cool oil so as to reduce its temperature. The displaced hot oil, along with the surplus cool oil, moves outwardly along the surface of rotating thrust collar 10 due to centrifugal force and enters the housing which is not shown in the drawing and is delivered back to the oil pump by conventional means hwich is not shown in the drawings. In addition to cooling the hot oil film on the thrust collar 10 between the bearing pads 18, the flow of cool oil through the ducts 34 also serves to cool the bearing pads 18. This is an important feature of this invention since the temperature of the bearing pads 18 can also be raised to a harmful level under high speed and/or load conditions. As best shown in FIG. 1, enough of the ducts 34 are provided in each side of each bearing pad 18 to completely cover the space between the bearing pads with overlapping oil jets so as to disturb the hot oil film on the rotating thrust collar 10 from its inner periphery to its outer periphery. In this particular embodiment of the invention, five of the ducts 34 are used on each side of each bearing pad 18, but it will be apparent to those skilled in the art that a larger or smaller number of the ducts may be employed in other embodiments of the invention.

This invention is also concerned with improvements in the means for mounting the bearing pads 18 in the annular recess 16 of retainer ring 14. In this particular embodiment, an inwardly-projecting annular lip 40 is provided on the upper inside surface of the retainer ring 14 above the annular recess 16. Lip 40 interacts with a matching lip 42 formed on the inside lower edge of each pad 18. When the pads 18 are inserted into the annular recess 16 in retainer ring 14, they are tilted so that the lip 42 clears the lip 40 and comes to rest below it as shown in FIG. 2. The lips 40 and 42 are dimensioned so as to normally overlap one another when the corresponding bearing pad 18 is seated in the annular recess 16 of retainer ring 14. The bearing pad 18 is locked within the annular ring 16 after it has been inserted therein by means of screws 44 which extend through the retainer ring 14 at spaced locations around the periphery thereof (see FIG. 1) and extend into openings 46 in the outer edge of each bearing pad 18. The screws 44 fit loosely within the openings 46 since their function is to prevent the pad 18 from tilting to such an extent as to disengage the lip 42 from the lip 40, without interfering with the normal tilting action of pads 18. Screws 44 prevent the pads 18 from falling out when the bearing assembly is being moved from place to place. It will be understood, of course, that the bearing pads 18 are held in position when the bearing is in the use due to the pressure of thrust collar 10 on the bearing surface 20.

In addition to preventing the bearing pads 18 from falling out of the annular recess 16 in retainer ring 14, it is also necessary to limit their circumferential movement to prevent any two bearing pads from approaching each other too closely. In this embodiment, the circumferential movement of bearing pads 18 is limited by spacer cap screws 48, which are threaded into retainer ring 14 at circumferentially spaced locations, as shown in FIG. 1, with the head 50 of each cap screw 48 being located in the space between two adjacent bearing pads 18. The heads 50 of cap screws 48 are cylindrical in shape and have an end pocket to receive a hex wrench of the "Allen" type. The diameter of cap screw heads 50 is selected to provide a desired limiting effect on the circumferential movement of bearing pads 18. In other words, the diameter of cap screw heads 50 is selected to limit the circumferential movement of the pads 18 to a predetermined distance. A lock washer 52 may be positioned under each of the cap screw heads 50, but this is not essential and may be omitted if desired.

As a novel feature of this invention the cap screws 48 are prevented from becoming inadvertently unthreaded by vibration by the use of dowel pins 54 which are mounted in openings 56 in each bearing pad 18 immediately behind the corresponding cap screw head 50. Dowel pins 54 extend into the space between adjacent bearing pads 18 and are close enough to cap screw heads 50 to prevent cap screws 48 from coming unthreaded and detached. Dowel pins 54 are press fitted in their respective openings 56 and are long enough so that they will be prevented from working out of their opening 56 because of proximity to the end of the opposing bearing pad 18. The cap screw heads 50 and dowel pins 54 provide a simple, fail-safe means of limiting the circumferential movement of bearing pads 18 without interfering with their tiltability. It should be particularly noted that the cylindrical cap screw heads 50 form a line contact when they contact either of the ends of the bearing pads 18, and this line contact does not generate enough friction to interfere with the tiltability of the bearing pads 18.

Although this invention has been described in connection with one illustrative embodiment thereof, it should be understood that the invention is not limited to the disclosed embodiment, since changes can be made in the disclosed structure without departing from the basic principles of this invention. For example, although the disclosed embodiment is a tilting pad thrust bearing, this invention is also applicable to bearings having stationary pads. Also, although five oil ducts are provided in each side of each bearing pad in the disclosed embodiment of the invention, a larger or smaller number of ducts may be employed without altering the essential principles of the invention. Other modifications of the disclosed structure will be apparent to those skilled in the art, and this invention includes all modifications that fall within the scope of the following claims.

I claim:

1. In a thrust bearing having an annular bearing retainer and having a plurality of bearing pads with inner and outer faces and with end portions supported in circumferentially-spaced relationship around one face of said retainer, the outer faces of said pads providing a bearing surface for an adjacent rotatable thrust collar, the improvement comprising having each pad provided with oil ducts positioned to conduct oil from the inner face of said pad to the ends thereof, and means for supplying relatively cool oil under pressure to the duct portions at the inner face of each pad, the duct portions adjacent the ends of each pad being disposed and positioned to direct jets of said cool oil against said thrust collar in the spaces between the ends of adjacent pads to reduce the temperature of the oil film carried by said thrust collar from one pad to another.

2. The improvement defined in claim 1 wherein each bearing pad is provided with a plurality of internal oil ducts with discharge ends which are spaced apart from each other at the ends of said pad to direct a plurality of spaced oil jets against said thrust collar in the spaces between the ends of adjacent pads.

3. The improvement defined in claim 1 in which said oil ducts extend obliquely and communicate at the inner ends with the inner face of the pad intermediate its length and at their outer ends with end portions of the pad.

4. The improvement defined in claim 1 wherein said means for supplying relatively cool oil under pressure to the duct portions at the inner face of each pad includes means forming a plurality of oil chambers in the surface of said retainer which supports said bearing pads, each of said oil chambers being positioned under the duct portions at the inner face of a corresponding pad, and means for supplying relatively cool oil under pressure to each of said oil chambers.

5. The improvement defined in claim 4 and further comprising an annular resilient oil seal around each of said oil chambers.

6. The improvement defined in claim 4 wherein said means for supplying relatively cool oil under pressure to each of said oil chambers includes an annular oil groove extending around the outer periphery of said retainer and a plurality of oil ducts each extending between said oil groove and a corresponding one of said oil chambers.

7. The improvement defined in claim 4 and further comprising a hardened bearing button attached to the bottom of each bearing pad and shaped to tiltably support the corresponding bearing pad against the adjacent surface of the bearing retainer, wherein each of said bearing buttons is positioned to contact said retainer within a corresponding one of said oil chambers.

8. The improvement defined in claim 4 wherein said means forming said plurality of oil chambers includes a circular series of annular grooves in the surface of said retainer, each of said annular grooves being positioned adjacent the inner face of a corresponding pad, and duct means communicating with each of said annular grooves to convey cool oil under pressure thereinto.

9. The improvement defined in claim 1 and further comprising a plurality of spacer elements each attached to said retainer and each positioned in the space between a corresponding adjacent pair of bearing pads to limit the circumferential movement thereof.

10. In a thrust bearing having an annular bearing retainer and having a plurality of bearing pads supported in circumferentially-spaced relationship around one face of said retainer, the outer faces of said pads providing a bearing surface for an adjacent rotatable thrust collar, the improvement comprising cap screws threaded into openings in said annular retainer and having cylindrically-shaped heads positioned in the spaces between the ends of adjacent pairs of bearing pads, the diameter of each cylindrical cap screw head being of a size to limit the circumferential movement of said bearing pads to a predetermined distance, and a dowel projecting from the end of one of each adjacent pairs of bearing pads radially inwardly of the head of the corresponding cap screw to prevent the same from becoming inadvertently removed from its threaded connection with said retainer.

11. In a thrust bearing having an annular bearing retainer and having a plurality of bearing pads with inner and outer faces and with end portions supported in circumferentially spaced relationship around one face of said retainer, the outer faces of said pads providing a bearing surface for an adjacent rotatable thrust collar, the improvement comprising having each pad provided with oil ducts positioned to conduct oil through the pad to at least one end thereof, and means for supplying relatively cool oil under pressure to said duct portions of the pads, the duct portions adjacent the ends of the pads being disposed and positioned to direct jets of said cool oil against said thrust collar in the spaces between the ends of adjacent pads to reduce the temperature of the oil film carried by said thrust collar from one pad to another.

* * * * *